United States Patent Office 3,439,089
Patented Apr. 15, 1969

3,439,089
MEDICATED HARD CANDY
Max A. Cherkas, Philadelphia, and Ellwood T. Martin, Jr., Blue Bell, Pa., assignors to Merck & Co., Inc., Rahway, N.J., a corporation of New Jersey
No Drawing. Continuation-in-part of application Ser. No. 343,128, Feb. 6, 1964. This application Mar. 27, 1968, Ser. No. 716,362
Int. Cl. A61k 27/00
U.S. Cl. 424—78                                      3 Claims

ABSTRACT OF THE DISCLOSURE

An exceptionally large amount of a solid medicament can be incorporated in a lozenge of the hard candy type by adding the medicament to a solid polyethylene glycol and heating to a liquid state and mixing them and then incorporating this in the hard candy base.

Prior art

Frey, 3,271,256; Frey, 3,295,992; Hammer et al., 2,963,404.

Related case

This application is a continuation-in-part of U.S. patent application Ser. No. 343,128, filed on Feb. 6, 1964, now abandoned.

This invention relates to a medicated hard candy and to a method of making the same for administration to humans and animals. More particularly, this invention concerns a hard candy (hereinafter referred to as a lozenge) having a base composed essentially of sugar and glucose and containing more of a solid therapeutic agent than has been heretofore achieved. The present invention makes it possible to add to a hard candy base a solid medicament amounting to about 4–10% by weight of the base.

The preparation of a lozenge is a difficult and critical art. Successful preparation requires heating a mixture of sugar and glucose in water until a clear supersaturated solution is formed, thorough mixing of the solution and subsequent uniform deposition of solids by means of controlled cooling rates. The addition of solid (therapeutic) materials to the molten candy mass radically alters the structure of the candy probably by modifying its density or hardness, often resulting in a product which is excessively soft and tacky and therefore unuseable. The addition of solid materials may also cause inversion of the sugar in solution, thereby preventing the formation of a hard candy matrix.

For these and other reasons, it has been considered necessary to limit the therapeutic ingredient to a small amount, often an insufficient amount, in the preparation of lozenges of this type.

There has been a need for many years to administer large therapeutic doses of medicaments in the form of a palatable hard candy lozenge, and the provision of such a dosage form is an important object of this invention.

Another object of this invention is to provide an effective method of incorporating large therapeutic doses of medicaments into a lozenge without interfering with its hard candy form.

In accordance with this invention it is now possible to have incorporated in the lozenge as much as about 4–10% by weight of the hard candy base, one or more medicaments and other solids into a lozenge without appreciably altering the hard candy structure necessary for the proper formation of the lozenge. It has been discovered that when polyethylene glycol having a molecular weight of from about 4,000 to 20,000 is first mixed with the medicament and this mixture is then incorporated into a concentrated solution of sugar and glucose, it is possible to add relatively large quantities of the desired medicament to the molten candy base without interfering with the subsequent formation of the hard candy nature of the lozenge. The presence of small quantities of polyethylene glycol surprisingly makes it possible to solubilize substantially larger quantities of medicament in the molten sugar-glucose candy base. Subsequently, when the product is concentrated and cooled it is believed that the medicament co-solidifies with the sugar and glucose thus becoming uniformly dispersed in the hard candy matrix, producing an excellent lozenge which is free of opaque spots and also free of grittiness.

Of particular advantage is the low melting point of polyethylene glycol 6000, which is 60–63° C. When the medicament and other solid ingredients are added to the glycol and the mixture heated to about 90–100° C., a liquid merge occurs, and the resulting product is added at this temperature to the hot candy base which is also at 90–100° C., thoroughly blended and the total uniform mixture is formed into any desired hard candy form, such as a lozenge. This ability to form the candy lozenge at a relatively low temperature makes it possible to use medicaments which would decompose at the higher temperatures that previously were necessary for the formation of a candy lozenge without the use of polyethylene glycol.

The term "glucose" as used herein is intended to include natural and derivative substances containing glucose, such as corn syrup, for example.

The polyethylene glycols which are utilized in accordance with this invention are polymers of ethylene oxide having the general formula $HOCH_2(CH_2OCH_2)_nCH_2OH$, where $n$ represents the average number of oxyethylene groups. Polyethylene glycols in this series may have molecular weights which vary through a well-defined range, the preferred range for use in the lozenge of this invention being between about 4,000 to 20,000. The specific $n$ value to be used depends on the characteristics sought in the final product. As the average molecular weight of the polyethylene glycol increases, the hygroscopicity and the solvent power decrease and the viscosity of its aqueous solutions increases as does its melting point.

The proportions of ingredients according to this invention are critical. The hot candy base preferably comprises about 60–85% by weight sugar and about 15–40% by weight of glucose. While the quantities of polyethylene glycol and medicament may vary, they should total about 7–16% of the weight of the hot candy base; the glycol should preferably amount to about 3–6% and the medicament about 4–10% by weight of the candy base to which they are to be added. Where citric acid is added, the quantity is about 1 to 3 parts by weight of the hot candy base.

The following examples are not intended to limit the scope of applicants' invention but are considered illustrative of typical lozenge preparations according to this invention.

EXAMPLE 1

Candy base:
    Sugar (medium fine granules) _____ kg__ 35.0
    Corn syrup 43° Baumé _____ kg__ 21.0
Medicament mixture:
    Polyethylene glycol (6,000 m.w.) _____ kg__ 2.75
    Acetaminophen (4'-hydroxyacetanilide) _kg__ 5.0
    Citric acid _____ kg__ .60
    Wild cherry imitation flavor _____ gm__ 60.0

In preparing the candy base, the sugar is dissolved in 5.5 liters of water, and the glucose-containing corn syrup is added and mixed well. At this point, any desired dye may be added to impart the required color. The dye must be dissolved thoroughly.

The above mixture is placed in a steamjacketed kettle which is heated to 125° C. from which it is pumped into a storage vessel that feeds a continuous cooker. As the syrup passes through a coil in the cooker, it reaches a temperature of 125–150° C. and is then fed into a receiving kettle maintained at 28–29 inches of vacuum by means of a steam vacuum ejector for a period of about 6–7 minutes. During this period water is removed until it is reduced to about 1% or less and a suitable molten candy base is formed. The candy base then is permitted to cool slowly.

The medicament, citric acid and imitation flavor in powdered form are added to the polyethylene glycol and the mixture then fluidized by heating at about 90° C. The hot fluid mixture is rapidly added to the molten candy base (the temperature of which has been reduced to about 100° C. or slightly below) with adequate mixing. The total mass then is kneaded thoroughly and subsequently transferred to a spinning machine which extrudes it into lozenge forming dies. Alternatively the medicated molten candy mass can be poured onto cooling tables where it solidifies to a semi-solid mass which then may be formed into any desired shape for dispensing a unit dosage of the medicament.

EXAMPLE 2

| | |
|---|---|
| Sugar (fine granules) _____kg__ | 35 |
| Glucose U.S.P. _____kg__ | 21 |
| Polyethylene glycol (6,000 m.w.) _____kg__ | 3 |
| Aluminum aspirin _____kg__ | 5 |
| Citric acid _____kg__ | 0.6 |
| Orange flavor, imitation _____gm__ | 60 |

EXAMPLE 3

| | |
|---|---|
| Sugar _____kg__ | 35 |
| Corn syrup 43° Baumé _____kg__ | 21 |
| Polyethylene glycol (6,000 m.w.) _____kg__ | 3 |
| Salicylamide _____kg__ | 5 |
| Citric acid _____kg__ | 0.5 |
| Citrus imitation flavor _____gm__ | 50 |

EXAMPLE 4

| | |
|---|---|
| Sugar (medium granules) _____kg__ | 35 |
| Corn syrup 43° Baumé _____kg__ | 21 |
| Polyethylene glycol (6,000 m.w.) _____kg__ | 3 |
| Acetylsalicylic acid _____kg__ | 3 |
| Citric acid _____kg__ | 0.6 |
| Citrus type imitation flavor _____gm__ | 60 |

EXAMPLE 5

| | Kg. |
|---|---|
| Sugar (fine granules) _____ | 60 |
| Glucose U.S.P. _____ | 40 |
| Polyethylene glycol (4,000 m.w.) _____ | 5 |
| Acetaminophen _____ | 4 |
| Citric acid _____ | 1.5 |

EXAMPLE 6

| | |
|---|---|
| Sugar (medium granules) _____kg__ | 35 |
| Corn syrup 43° Baumé _____kg__ | 21 |
| Polyethylene glycol (4,000 m.w.) _____kg__ | 3 |
| Acetylsalicylic acid _____kg__ | 3 |
| Citric acid _____kg__ | 0.6 |
| Orange flavor, imitation _____gm__ | 60 |

EXAMPLE 7

| | Kg. |
|---|---|
| Sugar (medium granules) _____ | 67 |
| Glucose U.S.P. _____ | 33 |
| Polyethylene glycol (20,000 m.w.) _____ | 5 |
| Acetaminophen _____ | 10 |
| Citric acid _____ | 1.5 |
| Citrus imitation flavor _____ | 0.1 |

EXAMPLE 8

| | Kg. |
|---|---|
| Sugar (medium granules) _____ | 67 |
| Glucose U.S.P. _____ | 33 |
| Polyethylene glycol (20,000 m.w.) _____ | 5 |
| Calurin (Merck Index, 7th Ed. page 190) _____ | 10 |
| Orange flavor imitation _____ | 0.1 |

EXAMPLE 9

| | Kg. |
|---|---|
| Sugar (medium granules) _____ | 67 |
| Glucose _____ | 33 |
| Polyethylene glycol (6,000 m.w.) _____ | 5.0 |
| Dextromethorphen 10% adsorbate _____ | 10.0 |
| Grape flavor, imitation _____ | 0.1 |

In each of the Examples 2 through 9 the sugar and glucose or corn syrup is dissolved in about 5 liters of water and heated to form a molten candy base employing the equipment and method described in Example 1 and then allowed to cool slowly to about 90–100° C.

The medicament and other ingredients are dissolved in the polyethylene glycol by the process also described in Example 1 and then added to the hot candy base and worked up into any desired form containing a unit dosage of the medicament as suggested in that example or by other methods known to those skilled in the art for extruding, punching or cutting hard candy forms.

Although this invention has been disclosed with reference to specific embodiments thereof, it will be appreciated that equivalents may be substituted without departing from the spirit and scope of the invention as defined in the appended claims.

What is claimed is:

1. The method of making a shaped hard candy containing a larger quantity of a solid medicament than could otherwise be contained, comprising:
   (a) making a hard candy base by heating and mixing together at a temperature above 100° C., sugar and glucose to obtain a mixture of about 60–85% by weight sugar and 40–15% by weight of glucose to which the medicament will be added and then slowly cooling it to about 90–100° C.,
   (b) separately heating and mixing together to 90–100° C. a solid polyethylene glycol and a solid medicament to thereby obtain their liquid merge, the polyethylene glycol having an average molecular weight of from about 4000 to 20,000 and being in a quantity to constitute about 3–6% by weight of said hard candy base, the solid medicament being in a quantity to constitute about 4–10% by weight of said hard candy base,
   (c) rapidly adding (a) and (b) together while mixing them and while still hot,
   (d) shaping the mixture to the selected form for unit administration.

2. The method according to claim 1 in which said medicament is selected from the group consisting of acetaminophen, aluminum aspirin, salicylamide, hexylresorcinol, and aspirin.

3. A lozenge which is produced by making a shaped hard candy containing a larger quantity of solid medicament than could otherwise be contained, comprising:
   (a) making a hard candy base by heating and mixing together at a temperature above 100° C., sugar and glucose to obtain a mixture of about 60–85% by weight sugar and 40–15% by weight of glucose to which the medicament will be added and then slowly cooling it to about 90–100° C.,
   (b) separately heating and mixing together to 90–100° C. a solid polyethylene glycol and a solid medicament to thereby obtain their liquid merge, the polyethylene glycol having an average molecular weight of from about 4000 to 20,000 and being in a quantity to constitute about 3–6% by weight of said hard candy base, the solid medicament being in a quantity to constitute about 4–10% by weight of said hard candy base,
   (c) rapidly adding (a) and (b) together while mixing them and while still hot,
   (d) shaping the mixture to the selected form for unit administration.

(References on following page)

References Cited

UNITED STATES PATENTS

| | | | |
|---|---|---|---|
| 2,963,404 | 12/1960 | Hammer et al. | 167—82 |
| 3,271,256 | 9/1966 | Frey | 167—82 |
| 3,295,992 | 1/1967 | Frey | 99—134 |

ELBERT L. ROBERTS, *Primary Examiner.*

S. K. ROSE, *Assistant Examiner.*

U.S. Cl. X.R.

424—234, 235, 324, 346